United States Patent
Sun et al.

(10) Patent No.: US 10,512,117 B2
(45) Date of Patent: Dec. 17, 2019

(54) COMPUTER PROGRAM, COMPUTER-READABLE STORAGE MEDIUM, FIRST TRANSMISSION POINT AND METHOD PERFORMED THEREIN

(71) Applicant: Telefonaktiebolaget LM Ericsson (publ), Stockholm (SE)

(72) Inventors: Ying Sun, Sundbyberg (SE); Peter Erlandsson, Solna (SE); Björn Nordström, Solna (SE); Dániel Pelyhe, Täby (SE); Magnus Persson, Sollentuna (SE); Christian Skärby, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 6 days.

(21) Appl. No.: 15/755,934

(22) PCT Filed: Aug. 31, 2015

(86) PCT No.: PCT/SE2015/050916
§ 371 (c)(1),
(2) Date: Feb. 27, 2018

(87) PCT Pub. No.: WO2017/039498
PCT Pub. Date: Mar. 9, 2017

(65) Prior Publication Data
US 2018/0343699 A1    Nov. 29, 2018

(51) Int. Cl.
*H04W 76/25* (2018.01)
*H04B 7/024* (2017.01)
(Continued)

(52) U.S. Cl.
CPC ............ *H04W 76/25* (2018.02); *H04B 7/022* (2013.01); *H04B 7/024* (2013.01); *H04L 1/20* (2013.01);
(Continued)

(58) Field of Classification Search
CPC ....... H04L 5/0092; H04L 5/0007; H04L 1/20; H04L 5/0057; H04B 7/024; H04B 7/0684;
(Continued)

(56) References Cited

U.S. PATENT DOCUMENTS

2013/0094388 A1    4/2013    Furuskär et al.
2013/0114435 A1    5/2013    Wang et al.

FOREIGN PATENT DOCUMENTS

EP    2 869 485 A1    5/2015
WO    2013112829 A1    8/2013

OTHER PUBLICATIONS

3GPP TSG-RAN WG1 #66 Athens, Greece, Aug. 22-26, 2011 Source: Intel Corporation Title: Analysis of CRS and PDSCH collisions in Scenarios 3 and 4 (Year: 2011).*

(Continued)

*Primary Examiner* — Nizar N Sivji
(74) *Attorney, Agent, or Firm* — Patent Portfolio Builders, PLLC

(57) ABSTRACT

Embodiments herein relate to a method performed by a first transmission point (12) out of at least two transmission points for estimating a channel quality gain of a wireless device (10) served by the first transmission point (12) in a wireless communication network (1). The first transmission point (12) coordinates transmissions with a second transmission point (13) out of the at least two transmission points in the wireless communication network (1). The first transmission point estimates the channel quality gain based on (Continued)

whether a first cell specific reference signal, CRS, configuration of the first transmission point (12) is using radio resources for a first CRS that are colliding or not with radio resources used for a second CRS of a second CRS configuration of the second transmission point (13) in the wireless communication network (1), and a utilization of frequency resources by the second transmission point (13).

15 Claims, 5 Drawing Sheets

(51) Int. Cl.
  *H04L 1/20*  (2006.01)
  *H04L 5/00*  (2006.01)
  *H04L 25/02*  (2006.01)
  *H04W 76/27*  (2018.01)
  *H04B 7/022*  (2017.01)
  *H04B 17/309*  (2015.01)

(52) U.S. Cl.
  CPC ............ *H04L 5/005* (2013.01); *H04L 5/0035* (2013.01); *H04L 25/0202* (2013.01); *H04W 76/27* (2018.02); *H04B 17/309* (2015.01)

(58) Field of Classification Search
  CPC .... H04B 7/0617; H04B 17/309; H04B 7/022; H04B 7/0632; H04W 74/0816; H04W 76/27; H04W 76/25; H04W 74/085; H04W 72/1205; H04J 11/0023
  See application file for complete search history.

(56) References Cited

OTHER PUBLICATIONS

International Search Report and Written Opinion issued in International Application No. PCT/SE2015/050916, dated May 4, 2016, 11 pages.

* cited by examiner

COMPUTER PROGRAM, COMPUTER-READABLE STORAGE MEDIUM, FIRST TRANSMISSION POINT AND METHOD PERFORMED THEREIN

CROSS REFERENCE TO RELATED APPLICATION(S)

This application is a 35 U.S.C. § 371 National Stage of International Patent Application No. PCT/SE2015/050916, filed Aug. 31, 2015, designating the United States, the disclosure of which is incorporated by reference.

TECHNICAL FIELD

Embodiments herein relate to a computer program, a computer-readable storage medium, a first transmission point and a method performed therein regarding wireless communication. In particular, embodiments herein relate to a first transmission point out of at least two transmission points estimating a channel quality gain to a wireless device in a wireless communication network.

BACKGROUND

In a typical wireless communication network, wireless devices, also known as wireless communication devices, mobile stations, stations (STA) and/or user equipments (UEs), communicate via a Radio Access Network (RAN) to one or more core networks. The RAN covers a geographical area which is divided into areas or cell areas, with each area or cell area being served by a radio network node such as a radio access node e.g., a Wi-Fi access point or a radio base station (RBS), which in some networks may also be called, for example, a "NodeB" or "eNodeB". The area or cell area is a geographical area where radio coverage is provided by the access node. The radio access node communicates over an air interface operating on radio frequencies with the wireless device within range of the radio access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some RANs, e.g. as in UMTS, several radio access nodes may be connected, e.g., by landlines or microwave, to a controller node, such as a radio network controller (RNC) or a base station controller (BSC), which supervises and coordinates various activities of the plural radio access nodes connected thereto. This type of connection is sometimes referred to as a backhaul connection. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of an RNC are distributed between the radio base stations, e.g. eNodeBs in LTE, and the core network. As such, the Radio Access Network (RAN) of an EPS has an essentially "flat" architecture comprising radio base stations connected directly to one or more core networks, i.e. they are not connected to RNCs. To compensate for that, the E-UTRAN specification defines a direct interface between radio base stations, this interface being denoted the X2 interface.

There exist today many coordination schemes to improve overall system efficiency of the wireless communication network by either increasing signal strength or decreasing the interference level such as Coordinated Multi-point (CoMP). Typical coordination schemes in the purpose of increasing signal strength are for example, downlink joint transmission and uplink joint reception wherein coordinated beamforming increases the signal strength of one wireless device without introducing interference to other wireless devices. CoMP is used to send and receive data to and from a wireless device from several transmission points to ensure that an optimum performance is achieved. Typical coordination schemes in the purpose of decreasing the interference are for example dynamic point blanking and dynamic point power control, wherein the signal quality in terms of Signal to Interference plus Noise Ratio (SINR) will be improved by reducing the interference power. To obtain Downlink (DL) CoMP gain, a channel quality gain due to reduced interference is estimated and then applied when selecting transport format for the wireless device.

3GPP Release (Rel)-11 of LTE has extended a channel state reporting framework with some new tools so that wireless devices supporting Rel-11 can be configured to measure the gains from the lower interference and report it to the radio network node. These tools are enabled when configuring a certain transmission mode introduced in rel-11 called Transmission Mode 10 (TM10).

For the legacy wireless devices, the channel quality gain has to be estimated based on some other means, such as Reference Signal Received Power (RSRP) or Reference Signal Received Quality (RSRQ). RSRP and RSRQ are measured on the wireless device side and reported in a measurement report back to the radio network node. RSRP is defined as a received power of the LTE Reference Signals and RSRQ is defined as:

RSRQ=(N*RSRP)/RSSI where N is a number of resource blocks over the entire bandwidth and Received Strength Signal Indicator (RSSI) is a received power of all symbols measured over the same bandwidth. The RSSI measures the average total received power observed only in Orthogonal frequency-division multiplexing (OFDM) symbols containing reference symbols for an antenna port 0, i.e., OFDM symbol 0 & 4 in a slot, in the measurement bandwidth over N resource blocks. RSSI is the total received power of the carrier. RSSI includes the power from co-channel serving & non-serving cells, adjacent channel interference, thermal noise, etc. Total measured over 12-subcarriers including Reference Signal (RS) from serving Cell and Traffic in the serving Cell. It should be noted that RSRP may be defined as the received power of Cell specific Reference signals (CRS) of the serving cell of one resource element (RE), i.e. in the unit of [W/RE]. RSSI is calculated as the sum of all received power over the bandwidth of one Physical Resource Block (PRB), i.e. in the unit of [W/PRB].

LTE networks may operate using different CRS configurations which results in different interference characteristics. In a non-shifted CRS configuration the same time and frequency resources are used for CRS transmissions in all cells of transmission points. Hence it avoids that the CRSs interfere with data transmissions, but is also associated with a systematic Channel State Information (CSI) estimation error; especially noticeable at low traffic. In a shifted CRS configuration different cells of different transmission points transmit CRSs on resources that are shifted in frequency, thus when using the shifted CRS configuration the CRSs interfere with data transmissions but the CSI estimation error is smaller. In reality, because a limited number of CRS shifts may be configured, a mixed situation occurs where a configured CRS might collide with both CRS and data from different cells.

Existing solutions of using multiple transmission points, utilize RSRP to measure and estimate channel quality gain from lowering interference. This results in a poor estimation of the channel quality since that is not reflecting the actual operation and leads to a poor usage of radio resources in the wireless communication network limiting the performance of the wireless communication network.

SUMMARY

An object of embodiments herein is to provide a mechanism that improves performance of the wireless communication network.

According to an aspect the object is achieved by a method performed by a first transmission point out of at least two transmission points for estimating a channel quality gain of a wireless device served by the first transmission point in a wireless communication network. The first transmission point coordinates transmissions with a second transmission point out of the at least two transmission points in the wireless communication network. The first transmission point estimates the channel quality gain based on whether a first cell specific reference signal, CRS, configuration of the first transmission point is using radio resources for a first CRS that are colliding or not with radio resources used for a second CRS of a second CRS configuration of the second transmission point in the wireless communication network, and a utilization of frequency resources by the second transmission point.

According to another aspect the object is achieved by a first transmission point out of at least two transmission points for estimating a channel quality gain of a wireless device served by the first transmission point in a wireless communication network. The first transmission point is configured to coordinate transmissions with a second transmission point out of the at least two transmission points in the wireless communication network. The first transmission point is configured to estimate channel quality gain based on whether a first CRS configuration of the first transmission point is using radio resources for a first CRS that are colliding or not with radio resources used for a second CRS of a second CRS configuration of the second transmission point in the wireless communication network, and a utilization of frequency resources by the second transmission point.

According to yet another aspect the object is achieved by providing a computer program comprising instructions, which, when executed on at least one processor, cause the at least one processor to carry out the method according to embodiments herein as performed by the first transmission point.

According to still another aspect the object is achieved by providing a computer-readable storage medium, having stored thereon a computer program comprising instructions which, when executed on at least one processor, cause the at least one processor to carry out the method according to embodiments herein as performed by the first transmission point.

An advantage of embodiments of the claimed solution is that the estimation of the channel quality gain is taking the actual first and second CRS configuration into account in addition to the utilization of frequency resources by the second transmission point and thereby the estimation is closer to the real channel quality gain and hence the usage of radio resources in the wireless communication network is improved and thus also the performance of the wireless communication network.

BRIEF DESCRIPTION OF THE DRAWINGS

Embodiments will now be described in more detail in relation to the enclosed drawings, in which.

DETAILED DESCRIPTION

Figure 1:
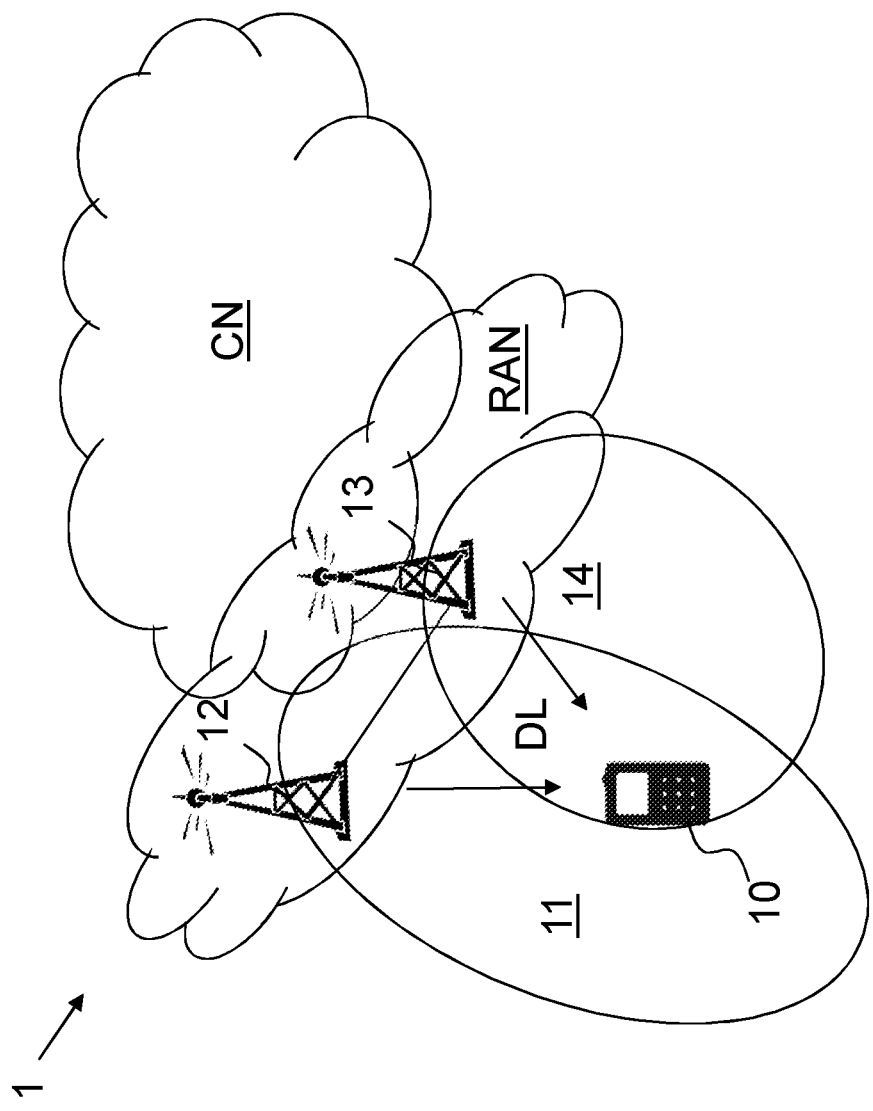
FIG. 1 shows a schematic overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use a number of different technologies, such as Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. The wireless communication network 1 is exemplified herein as a number of LTE networks.

In the wireless communication network 1, a wireless device e.g. a wireless device 10 such as a mobile station, a non-AP STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communication network 1 comprises a first transmission point 12, out of at least two transmission points in the wireless communication network 1, providing radio coverage over a geographical area, a first cell 11 or a serving cell, of a first radio access technology (RAT), such as LTE, Wi-Fi or similar. The first transmission point 12 serves the wireless device 10. The first transmission point 12 may be a radio network node such as an access point such as a Wireless Local Area Network (WLAN) access point or an Access Point Station (AP STA), an access controller, a base station, e.g. a radio base station such as a NodeB, an evolved Node B (eNB, eNode B), a base transceiver station, Access Point Base Station, base station router, a transmission arrangement of a radio base station, a remote radio unit, a stand-alone access point or any other network unit capable of communicating with a wireless device within the area served by the first transmission point 12 depending e.g. on the first radio access technology and terminology used.

Furthermore, the wireless communication network 1 comprises a second transmission point 13, out of the at least two transmission points in the wireless communication network 1, providing radio coverage over a geographical area, a second cell 14 or a neighboring cell, of a second radio access technology, such as LTE, Wi-Fi, WiMAX or similar. The second transmission point 13 may be a radio network node such as an access point such as a WLAN access point or an Access Point Station (AP STA), an access controller, a base station, e.g. a radio base station such as a NodeB, an evolved Node B (eNB, eNode B), a base transceiver station, Access Point Base Station, base station router, a transmission arrangement of a radio base station, a remote radio unit, a stand-alone access point or any other network unit capable of communicating with a wireless device within the area served by the second transmission point 13 depending e.g. on the second radio access technology and terminology used. The first and second RATs may be the same or different RATs. The first and second transmission points may be comprised in one radio network node or in separate radio network nodes. The first transmission point 12 coordinates transmissions with the second transmission point 13 out of the at least two transmission points in the wireless communication network 1.

Embodiments herein estimates a channel quality gain of the wireless device 10 based on whether the first CRS configuration of the first transmission point 12 is using radio resources for a first CRS that are colliding or not with radio resources used for a second CRS of the second CRS configuration of the second transmission point 13 in the wireless communication network 1, and a utilization of frequency resources by the second transmission point 13.

A notation of overlapping CRS and non-overlapping CRS is sometimes used herein, or colliding or not colliding radio resources of CRSs. Overlapping CRS is when CRS transmissions from two transmission points, e.g. the first transmission point 12 and the second transmission point 13, use the same radio resources, e.g. time and/or frequency resources, while non-overlapping CRS occurs when the CRS transmissions from two transmission points do not use the same radio resources. In a non-shifted CRS deployment all CRSs are overlapping while in a shifted deployment some CRSs are overlapping and some are non-overlapping as a consequence of the limited number of shifts that are available.

To not consider what interference is actually seen on the radio resources of the CRSs makes using RSRP to calculate gains from muting neighbor cells futile. For example, assume that an RSRP obtained from a measurement report from a wireless device indicates that a certain cell is a dominant interferer to that particular wireless device: existing CoMP schemes would take that as an indication to not perform Physical Downlink Shared Channel (PDSCH) transmissions in that cell and that would lead to the channel being better compared to what is indicated by a Channel Quality Indicator (CQI) or Channel State Information (CSI). However, if the interfering cell CRSs do not overlap with the serving cells CRSs and the interfering cell is low loaded, e.g. transmits seldom, the CSI actually reflects the case when the interfering cell is not transmitting, so the correct thing to do in case the interfering cell is not transmitting on PDSCH is to assume that the reported CSI reflects the channel quality. Should the interfering cell be transmitting however, the correct thing to do is to use the RSRP to lower the channel quality estimate, i.e. vice versa from what a prior art DL CoMP scheme would do.

Embodiments herein introduce a generic scheme supporting all network configurations. It estimates the channel quality gain adaptively depending on if a first CRS configuration of the first transmission point 12 and a second CRS configuration of the second transmission point 13, interfering the first cell 11, are using colliding radio resources. This may also be used to estimate a PDSCH external interference from transmission points of cells outside a coordination cluster.

Embodiments herein may use CRS shift, the utilization of frequency resources also denoted Frequency Resource or Physical Resource Block (PRB) utilization, and e.g. measured RSRP to tell what type of interference contribution an interfering cell, such as the second cell 14, has to the channel quality gain. The first transmission point 12 may then either boost (increase) or de-boost (lower) the channel quality gain accordingly in case of overlapping CRSs of the interfering cells and the interfering cells are performing e.g. a PDSCH transmission or not.

Channel quality estimations such as CSI reports from the wireless device 10 may be one or more of the following: pessimistic, e.g. in the case of overlapping CRS and a low frequency resource utilization; realistic, e.g. in the case of a high frequency resource utilization; or optimistic, e.g. in the case of non-overlapping CRS and a low frequency resource utilization. Embodiments herein are able to differentiate these cases to prevent that transmissions are made based on erroneous channel quality assumptions. Embodiments herein result in substantially increased accuracy of estimations of channel quality gain, e.g. RSRP based DL CoMP algorithms, in realistic deployments with shifted CRS.

Figure 2:
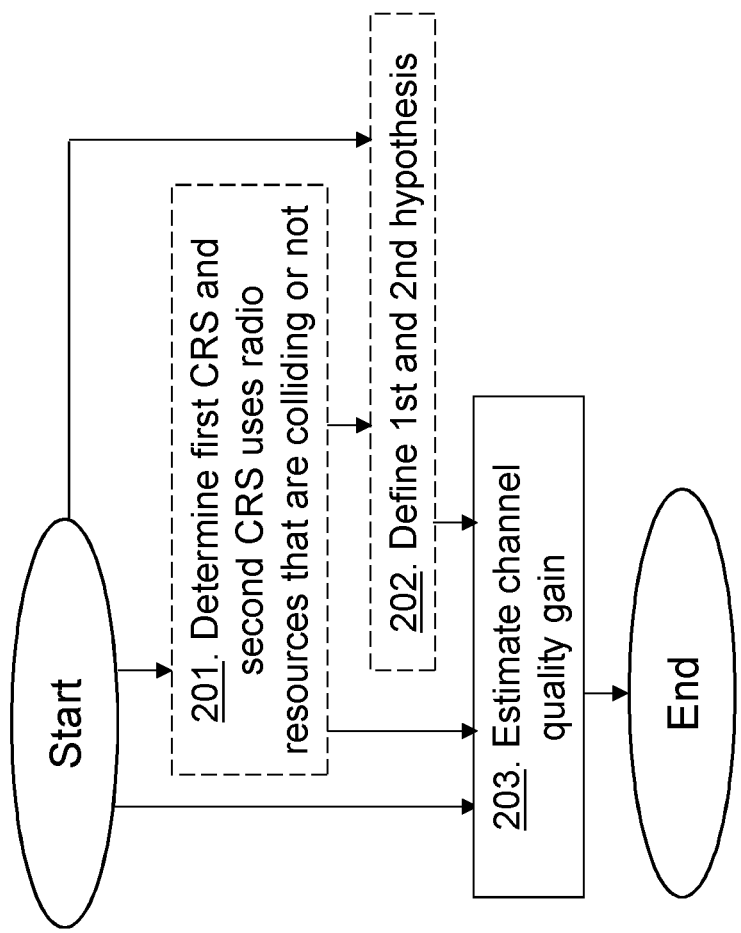
FIG. 2 shows a schematic flow chart depicting a method performed by a first transmission point according to embodiments herein.

The method actions performed by the first transmission point 12 out of at least two transmission points for estimating the channel quality gain of the wireless device 10 served by the first transmission point 12 in the wireless communication network 1 according to some embodiments will now be described with reference to a flowchart depicted in FIG. 2. The actions do not have to be taken in the order stated below, but may be taken in any suitable order. Actions performed in some embodiments are marked with dashed boxes. The first transmission point 12 coordinates transmissions with the second transmission point 13 out of the at least two transmission points in the wireless communication network 1.

Action 201. The first transmission point 12 may determine that the first CRS configuration of the first transmission point 12 is using radio resources for the first CRS that are colliding or not with radio resources used for the second CRS of the second CRS configuration of the second transmission point 13 in the wireless communication network 1. The first transmission point 12 may determine this based on a first Physical Cell Index (PCI) of the first cell 11 of the first transmission point 12 and a second PCI of the second cell 14 of the second transmission point 13, and the number of shifts that are used in the wireless communication network 1. The first transmission point 12 may determine this by computing the first CRS shift for the first transmission point 12 and the second CRS shift for the second transmission point 13. The first transmission point 12 may then compare the first CRS shift with the second CRS shift to determine that the first CRS configuration of the first transmission point 12 is using radio resources for the first CRS that are colliding or not with radio resources used for the second CRS of the second CRS configuration of the second transmission point 13 in the wireless communication network 1. The CRS shifts may be known or exchanged between the transmission points.

Action 202. The first transmission point 12 may define a first and second hypothesis for the second transmission point 13, wherein the first hypothesis considers frequency resources to be used by the second transmission point 13 and the second hypothesis considers frequency resources not to be used in the second transmission point 13. Thus, using these hypothesis to determine the utilization of frequency resources at or by the second transmission point 13.

Action 203. The first transmission point 12 estimates the channel quality gain based on whether the first CRS configuration of the first transmission point 12 is using radio resources for the first CRS that are colliding or not with radio resources used for the second CRS of the second CRS configuration of the second transmission point 13 in the wireless communication network 1, and a utilization of frequency resources by the second transmission point 13. Thus, the first transmission point 12 takes the actual CRS configurations into account and not an assumption. The first transmission point 12 may estimate the channel quality gain by using the first hypothesis and the second hypothesis. The first transmission point 12 may estimate the channel quality gain based on a received measurement report from the wireless device 10 served by the first transmission point 12. In some embodiments the first transmission point 12 may estimate the channel quality gain by using a colliding parameter indicating that the first CRS configuration of the first transmission point 12 is using radio resources for the first CRS that are colliding or not with radio resources used for the second CRS of the second CRS configuration of the second transmission point 13 in the wireless communication network 1. The colliding parameter equals one for a non-shifted case and is a sum of allocated number of scheduling blocks for all scheduled wireless devices by the second transmission point 13 divided by a total system bandwidth of the second transmission point 13.

Embodiments herein may adaptively compute coordination gain based on CRS configuration of serving and interfering cells. Embodiments herein may use CRS-shift and frequency resource utilization in addition to measured quality/power in order to determine what channel quality assumption to use when knowledge of interfering cell transmissions is available.

The insight that CSI can be pessimistic, realistic or optimistic depending on CRS-shift and the frequency resource utilization may be used and to use that information in conjunction with e.g. RSRP to determine how much to boost/deboost the channel quality is also disclosed herein.

Figure 3:
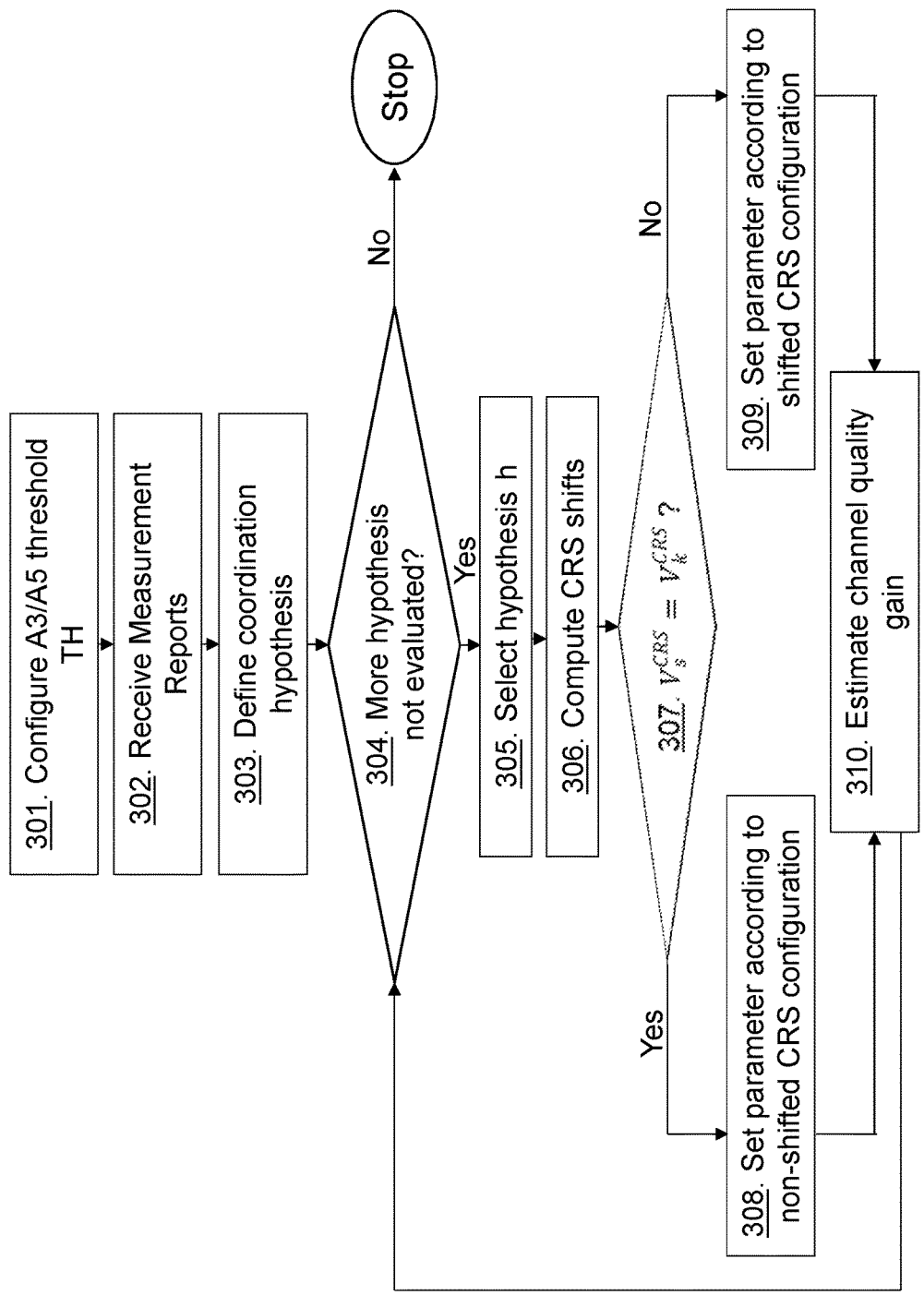
FIG. 3 shows a schematic flow chart depicting a method performed by a first transmission point according to embodiments herein.

Embodiments herein are described as below from action 305 to action 310 and the operations in the radio network node side are shown in FIG. 3. Actions 301-304, are also discussed for solution completeness.

Action 301. The first transmission point 12, e.g. serving eNB, configures report thresholds e.g. A3/A5 threshold (TH), for the wireless device 10 to report the received RSRP and/or RSRQ from serving cell 11 and neighboring cell 14. A3 threshold is a threshold when a neighbour cell becomes an offset better than the serving cell. A5 threshold is a threshold that the current cell is below an absolute threshold and the neigbouring cell is above a threshold. This would mean that the serving cell is not good enough and the neighbouring one is good. The wireless device 10 sends a measurement report if the configured threshold is met, indicating the wireless device 10 is being interfered by another radio network node, e.g. the second transmission point 13. For example, if A3 event is configured, that is, when the RSRP of the neighboring cell is higher than the serving cell for a threshold TH, the wireless device 10 is going to trigger and send a measurement report in case A3 event is fulfilled.

Action 302. The first transmission point 12, receives the measurement report and considers/identifies that the wireless device 10 is interfered by the neighboring cell that is reported in the measurement report.

Action 303. The first transmission point 12 defines a coordination hypothesis. For example, for dynamic point blanking the hypothesis is correspondent to all the possible muting or transmitting combinations. For example, there is one interfering cell k, then there are two hypothesis correspondent to the interference cell transmitting or muting. Thus, these coordination hypothesis are indicating utilization of frequency resources by the second transmission point 13.

Action 304. The first transmission point 12 may check if there is more hypothesis not evaluated? Yes, go to step 305, no, stop.

Action 305. The first transmission point 12 may select a hypothesis 'h' that is not evaluated.

Action 306. The first transmission point 12 may then compute a first CRS shift $V_s^{CRS}$ and a second CRS shift $V_k^{CRS}$ for serving cell s and neighboring cell k. This may be done based on the Physical Cell Index (PCI) of the cell, and the number of shifts ($N_{shift}$) that is used in the whole network.

$$V_i^{CRS} = PCI_i \bmod(N_{shift}).$$

Action 307. The first transmission point 12 compares $V_s^{CRS}$ and $V_k^{CRS}$, if $V_s^{CRS} = V_k^{CRS}$, the serving cell CRS is collided with interfering cell k (non-shifted case), go to action 308. Otherwise, the CRS is shifted between the two cells, go to step 309. This is an example of action 201 above in FIG. 2.

Action 308. The first transmission point 12 may set, for non-shifted case, $\bar{g}_k$ to 1 meaning there is full interference experienced at the CRS from the cell k CRS. Set $D_{h,k}$ for muting hypothesis and non-muting hypothesis according to non-shifted CRS case described above. $\bar{g}_k$ being referred to above as the colliding parameter.

Action 309. The first transmission point 12 may set, for shifted CRS case, $\bar{g}_k$ equal to the frequency resource utilization of cell k at the reception of CQI. Set $D_{h,k}$ for muting hypothesis and non-muting hypothesis according to shifted CRS case described above.

Action 310. The first transmission point 12 may compute the estimated CoMP gain based on equation Eq.1 below and the input from action 308 and action 309 depending on different interference cell k. This is an example of the action 203 in FIG. 2.

The first hypothesis may imply that the CRS is transmitted with a boosted power and the second hypothesis may imply that the CRS is transmitted with a de-boosted power.

For the wireless device 10 to be coordinated, the channel quality gain estimation may be based on a function taking CRS configuration and allocated resource of total resources into consideration e.g. as below:

$$\Delta SINR_h = f(\overline{g}_k, N_{ant}, RSRP_k, D_{h,k}, I_{extInPdsch})  \quad \text{Eq. 1}$$

Where $\Delta SINR_h$ denotes the estimated channel quality gain of transmission hypothesis h.

$RSRP_k$ represents the RSRP received from the interference cell k and k ∈ C. C is a set of cells to be coordinated. It can be defined based on geometry statistics of the cell, for example, the cells reported on measurement reports can be configured as a coordination cluster, together with the serving cell. $RSRP_k$ is measured on the wireless device side and sent through measurement report.

$N_{ant}$ is a number of antenna ports of the serving cell.

$\overline{g}_k$ indicates an interference factor, or colliding parameter, in the CSI report.

For a non-shifted case it equals to 1. For shifted case, it equals to the frequency resource utilization of cell k at the time when receiving CSI report. This is calculated by:

$$\overline{g}_k = \frac{\sum_{u \in U_k} SB_u}{BW},$$

the sum of allocated number of scheduling blocks (SB) for all the scheduled wireless devices in the cell k divided by the system bandwidth (BW).

$D_{h,k}$, is a factor to control the interference from cell k in different hypothesis h and it depends on CRS configuration, Control Format Indicator (CFI), load and transmission hypothesis.

$D_{h,k} = f_2 (P_k, A_{h,k}, B_k, x, y, z)$ depending on shifted CRS or non-shifted CRS;

where $P_k$ is the interference from cell k cause by Physical Downlink Control Channel (PDCCH) transmissions in cell k. It can be estimated by a PDCCH load in cell k. $P_k$ is a transmit power difference between PDCCH and CRS of cell k. When PDCCH resource configured in the interfering cell k is larger than PDCCH resource configured in the serving cell, the data on PDSCH might experience interference from the PDCCH transmission in cell k.

$A_{h,k}$ is the interference from cell k caused by transmission of data in OFDM symbols on PDSCH that does not contain CRS.

$$A_{h,k} = \begin{cases} P_{Pdsch,k} g_k^{cur}, & \text{Not muting} \\ 0, & \text{Muting} \end{cases}$$

where $g_k^{cur}$ is an estimated load on PDSCH in cell k and $P_{Pdsch,k}$ is the transmit power difference between PDSCH and CRS on cell k.

$B_k$ is an interference on PDSCH from CRS in neighboring cell k. $B_k$ is a constant used to model interference on PDSCH caused by CRS, which is independent on the frequency resource utilization of interfering cell k and muting hypothesis of data transmission.

x, y and z are factors to control how much parts P, A, B should impact the SINR of the serving cell. This depends on the difference in CFI between the serving cell and cell k, the number of antenna ports and the code block size. x+y+z always equal 1.

$I_{extInPdsch}$ may be the estimated external interference outside coordination cluster experienced on data channel, computed as a function based on frequency resource utilization of cell k at the time when receiving measurement report e.g.

$$I_{extInPdsch} = f_3(n, RSRP_s, RSRQ, \alpha_k, \overline{g}_{k,MR}, \theta_k) \quad \text{Eq 2}$$

where n is thermal noise

RSRQ is reported in measurement report of the wireless device 10. Since $$RSSI_s = \frac{RSRP_s}{RSRQ}$$

represents the total received power of a PRB for serving cell s, to obtain PDSCH external interference from outside cluster, the signal received power on data channel and the total received power on CRS shall be removed. This is done by subtracting the total received signal power on data channel, which is a function of RSRP of the interfering cell, the fraction of the resource elements used for the data channel, the frequency resource utilization and the total received power on CRS including both signal and interference power.

$\overline{g}_{k,MR}$ is the frequency resource utilization of cell k at the time when receiving measurement report $\alpha_k$ is a number of Resource Elements (RE) used by PDSCH for cell k. It depends on the number of antennas and is computed as a function of $X_k$, $Y_k$ and $P_{pdsch}$ where $X_k = N_{ant} > 2?2:N_{ant}$ and $Y_k = N_{ant} > 2?N_{ant} - 2:2$ $P_{pdsch}$ is the difference between the transmit power difference on PDSCH and CRS.

$\theta_k = 2X_k$ is the number of Resource Element (RE) used by CRS in one subframes.

The estimated channel quality gain may then be used e.g. performing a link adaptation or when scheduling data for the wireless device 10, taking the estimated channel quality gain into account.

Figure 4:
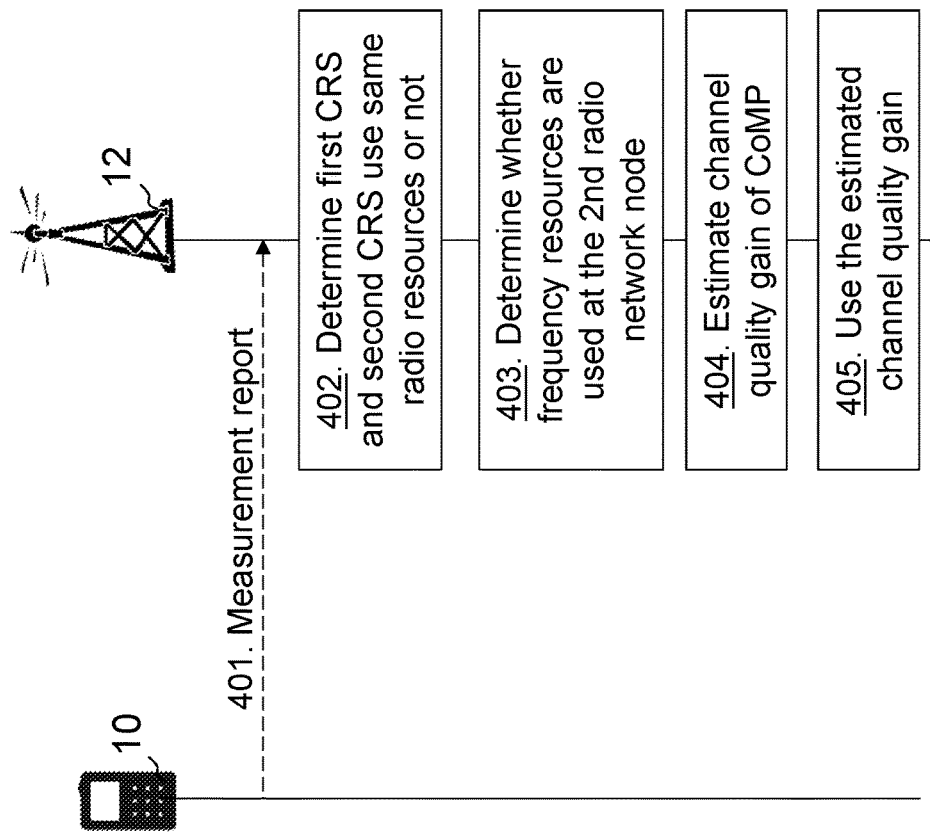
FIG. 4 shows a combined flow chart and signalling scheme according to embodiments herein.

FIG. 4 is a schematic combined flowchart and signaling scheme according to embodiments herein, between the first transmission point 12 out of at least two transmission points and the second transmission point out of the at least two transmission points for estimating a channel quality gain of the wireless device 10 served by the first transmission point 12 in the wireless communication network 1. The first transmission point 12 coordinates transmissions with the second transmission point 13 out of the at least two transmission points in the wireless communication network 1.

Action 401. The wireless device 10 transmits a measurement report indicating a channel quality gain of a connection to the wireless device 10 from the first transmission point, e.g. a RSRP value.

Action 402. The first transmission point 12 may determine that the first CRS configuration of the first transmission point 12 is using radio resources for the first CRS that are colliding or not with radio resources used for the second CRS of the second CRS configuration of the second transmission point 13 in the wireless communication network 1.

Action 403. The first transmission point 12 may determine the utilization of frequency resources at the second transmission point 13. The first transmission point 12 may e.g. order the second transmission point to mute its transmissions or the second transmission point 13 may inform the first transmission point 12 that the second transmission point 13 is muted or not. Thus, the first transmission point 12 may coordinate transmissions and/or know whether the second transmission point 13 is transmitting.

Action 404. The first transmission point 12 then estimates the channel quality gain based on whether the first CRS configuration is using radio resources for the first CRS that are colliding or not with radio resources used for the second CRS of the second CRS configuration, and the determined utilization of frequency resources by the second transmission point 13.

Action 405. The first transmission point 12 may then use the estimated channel quality gain when performing link adaptation or scheduling for the wireless device 10.

Figure 5:
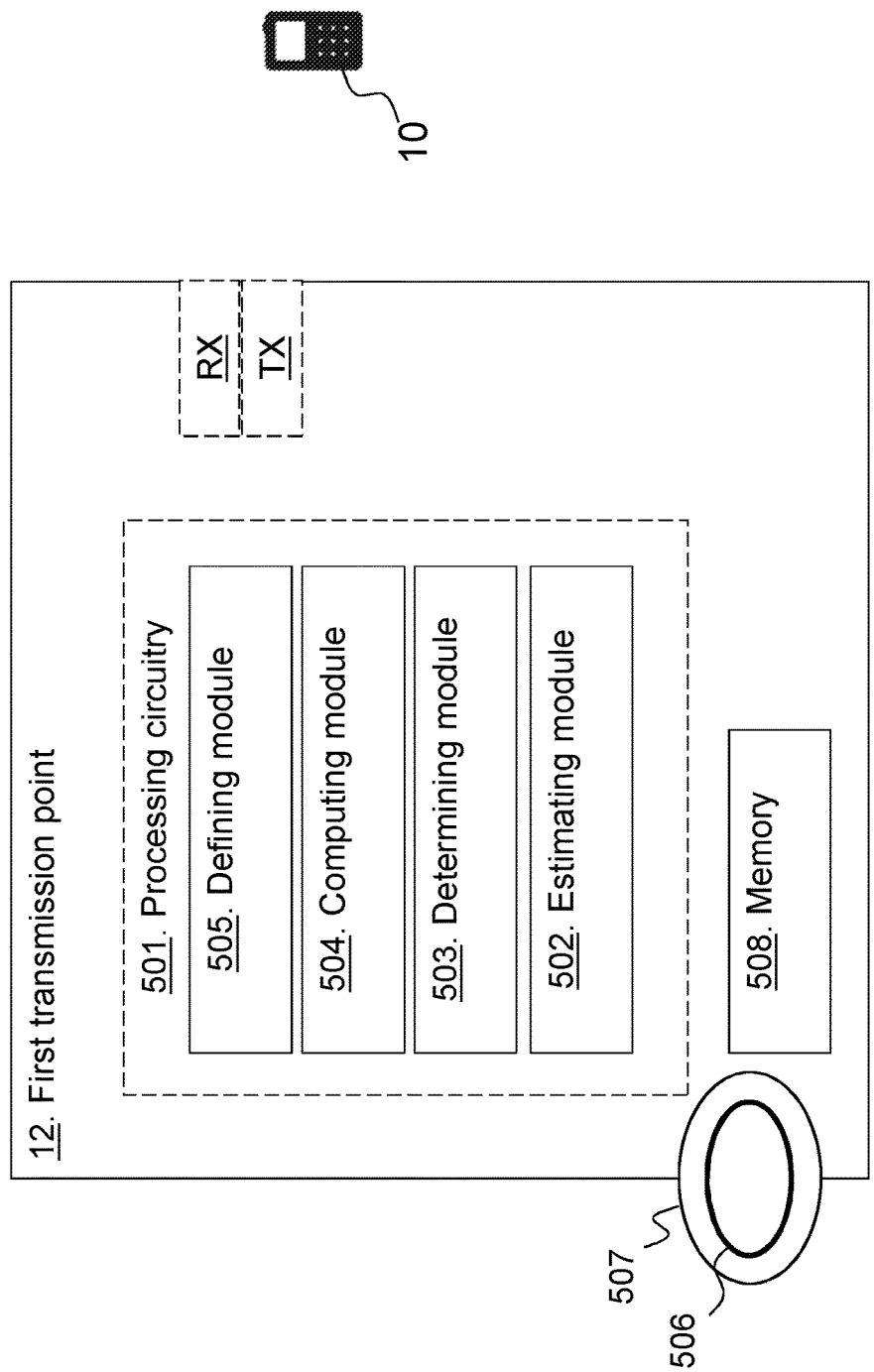
FIG. 5 shows a block diagram depicting a first transmission point according to embodiments herein.

FIG. 5 is a block diagram depicting the first transmission point 12 out of at least two transmission points for estimating a channel quality gain of the wireless device 10 served by the first transmission point 12 in the wireless communication network 1. The first transmission point 12 is configured to coordinate transmissions with the second transmission point 13 out of the at least two transmission points in the wireless communication network 1.

The first transmission point 12 is configured to estimate channel quality gain based on whether the first CRS configuration of the first transmission point 12 is using radio resources for the first CRS that are colliding or not with radio resources used for the second CRS of the second CRS configuration of the second transmission point 13 in the wireless communication network 1, and the utilization of frequency resources by the second transmission point 13.

The first transmission point 12 may be configured to determine that the first CRS configuration of the first transmission point 12 is using radio resources for the first CRS that are colliding or not with radio resources used for the second CRS of the second CRS configuration of the second transmission point 13 in the wireless communication network 1. Furthermore, the first transmission point 12 may be configured to determine that the first CRS configuration of the first transmission point 12 is using radio resources for the first CRS that are colliding or not with radio resources used for the second CRS of the second CRS configuration of the second transmission point 13 in the wireless communication network 1 based on a first PCI of the first cell 11 of the first transmission point 12 and a second PCI of the second cell 14 of the second transmission point 13, and the number of shifts that are used in the wireless communication network 1.

The first transmission point 12 may be configured to compute the first CRS shift for the first transmission point 12 and the second CRS shift for the second transmission point 13, and further configured to compare the first CRS shift with the second CRS shift to determine that the first CRS configuration of the first transmission point 12 is using radio resources for the first CRS that are colliding or not with radio resources used for the second CRS of the second CRS configuration of the second transmission point 13 in the wireless communication network 1.

The first transmission point 12 may be configured to define a first and second hypothesis for the second transmission point 13, wherein the first hypothesis considers frequency resources to be used by the second transmission point 13 and the second hypothesis considers frequency resources not to be used in the second transmission point 13; and the first transmission point 12 may further be configured to estimate the channel quality gain by using the first hypothesis and the second hypothesis. Thus, these hypothesis indicate utilization of frequency resources by the second transmission point 13.

The first transmission point 12 may be configured to estimate the channel quality gain based on a received measurement report from the wireless device 10 served by the first transmission point 12. The first transmission point 12 may be configured to estimate the channel quality gain by using a colliding parameter indicating that the first CRS configuration of the first transmission point 12 is using radio resources for the first CRS that are colliding or not with radio resources used for the second CRS of the second CRS configuration of the second transmission point 13 in the wireless communication network 1. The colliding parameter equals one for a non-shifted case of CSR and, for a shifted case of CSR, is a sum of allocated number of scheduling blocks for all scheduled wireless device by the second transmission point 13 divided by a total system bandwidth of the second transmission point 13.

The first transmission point 12 may be configured to estimate the channel quality gain by using an interference parameter, which interference parameter indicates an estimated external interference outside the at least two transmission points experienced on the channel.

For example, the first transmission point 12 may comprise processing circuitry 501 configured to perform the methods herein. Furthermore, the first transmission point 12 may comprise an estimating module 502. The processing circuitry 501 and/or the estimating module 502 may be configured to estimate channel quality gain based on whether the first CRS configuration of the first transmission point 12 is using radio resources for the first CRS that are colliding or not with radio resources used for the second CRS of the second CRS configuration of the second transmission point 13 in the wireless communication network 1, and the utilization of frequency resources by the second transmission point 13.

The first transmission point 12 may comprise a determining module 503. The processing circuitry 501 and/or the determining module 503 may be configured to determine that the first CRS configuration of the first transmission point 12 is using radio resources for the first CRS that are colliding or not with radio resources used for the second CRS of the second CRS configuration of the second transmission point 13 in the wireless communication network 1. Furthermore, the processing circuitry 501 and/or the determining module 503 may be configured to determine that the first CRS configuration of the first transmission point 12 is using radio resources for the first CRS that are colliding or not with radio resources used for the second CRS of the second CRS configuration of the second transmission point 13 in the wireless communication network 1 based on the first PCI of the first cell 11 of the first transmission point 12 and the second PCI of the second cell 14 of the second transmission point 13, and the number of shifts that are used in the wireless communication network 1.

The first transmission point 12 may comprise a computing module 504. The processing circuitry 501 and/or the computing module 504 may be configured to compute the first CRS shift for the first transmission point 12 and the second CRS shift for the second transmission point 13, and then the processing circuitry 501 and/or the determining module 503 may further be configured to compare the first CRS shift with the second CRS shift to determine that the first CRS configuration of the first transmission point 12 is using radio resources for the first CRS that are colliding or not with radio resources used for the second CRS of the second CRS configuration of the second transmission point 13 in the wireless communication network 1.

The first transmission point 12 may comprise a defining module 505. The processing circuitry 501 and/or the defining module 505 may be configured to define a first and second hypothesis for the second transmission point 13, wherein the first hypothesis considers frequency resources to be used by the second transmission point 13 and the second hypothesis considers frequency resources not to be used in the second transmission point 13; and the processing circuitry 501 and/or the estimating module 502 may further be configured to estimate the channel quality gain by using the first hypothesis and the second hypothesis.

The processing circuitry 501 and/or the estimating module 502 may further be configured to estimate the channel quality gain based on a received measurement report from the wireless device 10 served by the first transmission point 12. The processing circuitry 501 and/or the estimating module 502 may further be configured to estimate the channel quality gain by using a colliding parameter indicating that the first CRS configuration of the first transmission point 12 is using radio resources for the first CRS that are colliding or not with radio resources used for the second CRS of the second CRS configuration of the second transmission point 13 in the wireless communication network 1. The colliding parameter equals one for a non-shifted case of CSR and, for a shifted case of CSR, is a sum of allocated number of scheduling blocks for all scheduled wireless device by the second transmission point 13 divided by a total system bandwidth of the second transmission point 13.

The processing circuitry 501 and/or the estimating module 502 may further be configured to estimate the channel quality gain by using an interference parameter, which interference parameter indicates an estimated external interference outside the at least two transmission points experienced on the channel.

The methods according to the embodiments described herein for the first transmission point 12 are respectively implemented by means of e.g. a computer program 506 or a computer program product, comprising instructions, i.e., software code portions, which, when executed on at least one processor, cause the at least one processor to carry out the actions described herein, as performed by the first transmission point 12. The computer program 506 may be stored on a computer-readable storage medium 507, e.g. a disc or similar. The computer-readable storage medium 507, having stored thereon the computer program, may comprise the instructions which, when executed on at least one processor, cause the at least one processor to carry out the actions described herein, as performed by the first transmission point 12. In some embodiments, the computer-readable storage medium may be a non-transitory computer-readable storage medium.

The first transmission point 12 may comprise a memory 508. The memory comprises one or more units to be used to store data on, such as thresholds, estimated channel quality gain, hypothesis, CRS shifts, parameters, applications to perform the methods disclosed herein when being executed, and similar.

Furthermore, the first transmission point 12 may comprise a receiver(RX)/transmitter (TX) e.g. a transceiver to communicate with the second transmission point 13 and/or the wireless device 10.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a transmission point, for example.

Alternatively, several of the functional elements of the processing means discussed may be provided through the use of dedicated hardware, while others are provided with hardware for executing software, in association with the appropriate software or firmware. Thus, the term "processing circuitry" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed by a first transmission point for estimating a channel quality gain of a wireless device served by the first transmission point in a wireless communication network, wherein the first transmission point coordinates transmissions with a second transmission point in the wireless communication network, the method comprising:
   estimating the channel quality gain based on whether a first cell specific reference signal (CRS) configuration of the first transmission point is using radio resources for a first CRS that are colliding or not with radio resources used for a second CRS of a second CRS configuration of the second transmission point in the wireless communication network, and a utilization of frequency resources by the second transmission point, wherein the frequency resources include Physical Resource Blocks (PRBs), and wherein the estimating the channel quality gain comprises using a colliding parameter indicating that the first CRS configuration of the first transmission point is using the radio resources for the first CRS that are colliding or not with the radio resources used for the second CRS of the second CRS configuration of the second transmission point in the wireless communication network, which colliding parameter equals one for a non-shifted case of CRS and is a sum of allocated number of scheduling blocks for all scheduled wireless devices by the second transmission point divided by a total system bandwidth of the second transmission point, for a shifted case of CRS; and performing link adaptation and scheduling data for the wireless device based on the estimated channel quality gain.

2. The method of claim 1, further comprising:
determining whether the first CRS configuration of the first transmission point is using the radio resources for the first CRS that are colliding with the radio resources used for the second CRS of the second CRS configuration of the second transmission point in the wireless communication network.

3. The method of claim 2, wherein the determining is performed based on a first Physical Cell Index (PCI) of a first cell of the first transmission point and a second PCI of a second cell of the second transmission point, and number of shifts that are used in the wireless communication network.

4. The method of claim 2, wherein the determining comprises computing a first CRS shift for the first transmission point and a second CRS shift for the second transmission point and comparing the first CRS shift with the second CRS shift to determine whether the first CRS configuration of the first transmission point is using the radio resources for the first CRS that are colliding with the radio resources used for the second CRS of the second CRS configuration of the second transmission point in the wireless communication network, wherein the first CRS shift and the second CRS shift are calculated based on Physical Cell Index (PCI) of the cell and number of shifts that are used in the wireless communication network.

5. The method of claim 1, further comprising:
defining a first and a second hypothesis for the second transmission point, wherein the first hypothesis considers the frequency resources to be used by the second transmission point and the second hypothesis considers the frequency resources not to be used in the second transmission point, wherein the first hypothesis indicates that CRS is transmitted with a boosted power and the second hypothesis indicates that the CRS is transmitted with a de-boosted power, and wherein the estimating the channel quality gain comprises using the first hypothesis and the second hypothesis for determining the utilization of the frequency resources by the second transmission point.

6. The method of claim 1, wherein the estimating is based on a received measurement report from the wireless device served by the first transmission point.

7. The method of claim 1, wherein the estimating is using an interference parameter, which interference parameter indicates an estimated external interference.

8. A first transmission point for estimating a channel quality gain of a wireless device served by the first transmission point in a wireless communication network, wherein the first transmission point is configured to coordinate transmissions with a second transmission point in the wireless communication network, the first transmission point being configured to:
estimate channel quality gain based on whether a first cell specific reference signal (CRS) configuration of the first transmission point is using radio resources for a first CRS that are colliding or not with radio resources used for a second CRS of a second CRS configuration of the second transmission point in the wireless communication network, and a utilization of frequency resources by the second transmission point, wherein the frequency resources include Physical Resource Blocks (PRBs), and wherein the first transmission point is configured to estimate the channel quality gain by using a colliding parameter indicating that the first CRS configuration of the first transmission point is using radio resources for the first CRS that are colliding or not with radio resources used for the second CRS of the second CRS configuration of the second transmission point in the wireless communication network, which colliding parameter equals one for a non-shifted case of CRS and is a sum of allocated number of scheduling blocks for all scheduled wireless device by the second transmission point divided by a total system bandwidth of the second transmission point, for a shifted case of CRS; and
perform link adaptation or schedule data for the wireless device based on the estimated channel quality gain.

9. The first transmission point according to claim 8, further being configured to:
determine that the first CRS configuration of the first transmission point is using the radio resources for the first CRS that are colliding with the radio resources used for the second CRS of the second CRS configuration of the second transmission point in the wireless communication network.

10. The first transmission point according to claim 9, being configured to determine that the first CRS configuration of the first transmission point is using the radio resources for the first CRS that are colliding or not with the radio resources used for the second CRS of the second CRS configuration of the second transmission point in the wireless communication network based on a first Physical Cell Index (PCI) of a first cell of the first transmission point and a second PCI of a second cell of the second transmission point, and number of shifts that are used in the wireless communication network.

11. The first transmission point according to claim 9, being configured to compute a first CRS shift for the first transmission point and a second CRS shift for the second transmission point, and to compare the first CRS shift with the second CRS shift to determine that the first CRS configuration of the first transmission point is using the radio resources for the first CRS that are colliding or not with the radio resources used for the second CRS of the second CRS configuration of the second transmission point in the wireless communication network, wherein the first CRS shift and the second CRS shift are calculated based on Physical Cell Index (PCI) of the cell and number of shifts that are used in the wireless communication network.

12. The first transmission point according to claim 8, further being configured to:
define a first and a second hypothesis for the second transmission point, wherein the first hypothesis considers the frequency resources to be used by the second transmission point and the second hypothesis considers the frequency resources not to be used in the second transmission point, further wherein the first hypothesis indicates that CRS is transmitted with a boosted power and the second hypothesis indicates that the CRS is transmitted with a de-boosted power, and the first transmission point is being configured to estimate the channel quality gain by using the first hypothesis and the second hypothesis to determine the utilization of the frequency resources by the second transmission point.

13. The first transmission point according to claim 8, being configured to estimate the channel quality gain based on a received measurement report from the wireless device served by the first transmission point.

14. The first transmission point according to claim 8, being configured to estimate the channel quality gain by using an interference parameter, which interference parameter indicates an estimated external interference.

15. A computer program product comprising a non-transitory computer readable medium storing a computer program comprising instructions, which, when executed on at least one processor, cause the at least one processor to carry out the method of claim 1.

* * * * *